United States Patent
Kakura et al.

(10) Patent No.: US 7,746,807 B2
(45) Date of Patent: Jun. 29, 2010

(54) BAND LIMITING METHOD AND WIRELESS COMMUNICATION SYSTEM

(75) Inventors: Yoshikazu Kakura, Minato-ku (JP); Shousei Yoshida, Minato-ku (JP); Kengo Oketani, Minato-ku (JP)

(73) Assignee: NEC Corporation, Tokyo (JP)

( * ) Notice: Subject to any disclaimer, the term of this patent is extended or adjusted under 35 U.S.C. 154(b) by 134 days.

(21) Appl. No.: 12/279,152

(22) PCT Filed: Jan. 24, 2007

(86) PCT No.: PCT/JP2007/051041

§ 371 (c)(1),
(2), (4) Date: Aug. 12, 2008

(87) PCT Pub. No.: WO2007/094154

PCT Pub. Date: Aug. 23, 2007

(65) Prior Publication Data

US 2009/0201950 A1    Aug. 13, 2009

(30) Foreign Application Priority Data

Feb. 17, 2006   (JP) .............................. 2006-041003

(51) Int. Cl.
*H04J 1/16* (2006.01)
*H04H 7/30* (2006.01)
(52) U.S. Cl. ................... 370/252; 370/465; 375/232
(58) Field of Classification Search ................ 370/252, 370/465
See application file for complete search history.

(56) References Cited

U.S. PATENT DOCUMENTS

| | | | |
|---|---|---|---|
| 2002/0136288 A1* | 9/2002 | McCarty, Jr. ................ | 375/232 |
| 2002/0172276 A1* | 11/2002 | Tan et al. ..................... | 375/233 |
| 2004/0038693 A1* | 2/2004 | Niwano ...................... | 455/509 |
| 2004/0047430 A1* | 3/2004 | McCarty, Jr. ................ | 375/295 |
| 2004/0196897 A1* | 10/2004 | Tan et al. ..................... | 375/233 |
| 2005/0105651 A1* | 5/2005 | Jaffe et al. ................... | 375/326 |
| 2005/0238117 A1 | 10/2005 | Washakowski | |
| 2006/0217088 A1 | 9/2006 | Nagaoka | |
| 2006/0290819 A1* | 12/2006 | Benjebbour et al. ......... | 348/678 |
| 2007/0004465 A1* | 1/2007 | Papasakellariou et al. ... | 455/571 |

FOREIGN PATENT DOCUMENTS

JP    05-136829 A    6/1993

(Continued)

OTHER PUBLICATIONS

Yoichi Saito, "Modulation and Demodulation of Digital Wireless Communication," Institute of Electronics, Information and Communication Engineers, p. 47-57.

*Primary Examiner*—Andrew Lee
(74) *Attorney, Agent, or Firm*—Sughrue Mion, PLLC

(57) ABSTRACT

A receiver estimates a channel quality. A transmitter amplifies a signal by a gain proportional to a difference between a required signal-to-noise power ratio and channel quality information, which is an estimation result of the channel quality, and transmits the signal so that the receiver can obtain the signal-to-noise power ratio. In this case, the receiver or the transmitter determines a roll-off rate of an adaptive filter based on the channel quality information. The transmitter uses the adaptive filter of the determined roll-off rate to filter and transmit the signal.

17 Claims, 8 Drawing Sheets

FOREIGN PATENT DOCUMENTS

| | | |
|---|---|---|
| JP | 07-321861 A | 12/1995 |
| JP | 11-261481 A | 9/1999 |
| JP | 2003-158556 A | 5/2003 |
| JP | 2005-524282 A | 8/2005 |
| JP | 2005-252388 A | 9/2005 |
| WO | 2006/013693 A1 | 2/2006 |

\* cited by examiner

BAND LIMITING METHOD AND WIRELESS COMMUNICATION SYSTEM

TECHNICAL FIELD

The present invention relates to a band limiting method for limiting a bandwidth of a transmission/reception signal and a wireless communication system using the method.

BACKGROUND ART

In a wireless communication system, an example of a technique for limiting a bandwidth of a transmission/reception signal without causing a signal distortion includes a method using a root Nyquist filter. Hereinafter, a wireless communication system comprising a root Nyquist filter mentioned in Non-Patent Document 1 ("Modulation and Demodulation of Digital Wireless Communication" by Yoichi Saito, Institute of Electronics, Information and Communication Engineers, p. 47-57) will be described using FIG. 1.

FIG. 1 is a block diagram showing a configuration of a related wireless communication system.

As shown in FIG. 1, the wireless communication system comprises transmitter 801 and receiver 802.

Transmitter 801 comprises transmission symbol generator 103, pilot generator 104, signal multiplexer 105, root Nyquist filter 803, and variable gain amplifier 107.

Transmission symbol generator 103 generates transmission information to perform symbol mapping and outputs transmission symbol sequence $S_{TXS}$. Pilot generator 104 generates pilot symbol $S_{PI}$. Signal multiplexer 105 multiplexes transmission symbol sequence $S_{TXS}$ and pilot symbol $S_{PI}$ and outputs multiplexed signal $S_{MUX}$. Root Nyquist filter 803 applies filtering with root roll-off characteristics to multiplexed signal $S_{MUX}$ and outputs filtering transmission signal $S_{FTX}$. Variable gain amplifier 107 amplifies filtering transmission signal $S_{FTX}$ in accordance with channel quality information $S_{CQI}$ and outputs the signal as transmission signal $S_{TX}$.

Receiver 802 comprises root Nyquist filter 804, signal separator 109, data reproducer 110, and channel quality estimator 111.

Root Nyquist filter 804 applies filtering with root roll-off characteristics to reception signal $S_{RX}$ corresponding to transmission signal $S_{TX}$ and outputs filtering signal $S_{FRX}$. Signal separator 109 separates filtering signal $S_{FRX}$ into reception symbol sequence $S_{RXS}$ and reception pilot signal $S_{RXPI}$. Data reproducer 110 uses reception symbol sequence $S_{RXS}$ and reception pilot signal $S_{RXPI}$ to reproduce transmission data and outputs the data as reproduction data $S_{RED}$. Channel quality estimator 111 estimates a channel quality from reception pilot signal $S_{RXPI}$ and outputs the estimation result as channel quality information $S_{CQI}$.

In the wireless communication system shown in FIG. 1, transmitter 801 and receiver 802 use root Nyquist filters 803 and 804 to apply filtering to the transmission/reception signal, thereby limiting a signal band by roll-off characteristics as shown in FIG. 2, without causing signal distortion.

In the related wireless communication system, as shown in FIG. 2, the smaller the roll-off rate $\alpha$ ($0<\alpha<1$), the more sharply can the signal band be limited so that use efficiency of the radio frequency is improved. However, if the roll-off rate is made small, a PAPR (Peak to Average Power Ratio), which a ratio of peak power to average transmission power, becomes large. Therefore, transmission power needs to be limited to avoid signal distortion due to saturation of a transmission amplifier (variable gain amplifier shown in FIG. 1). Thus, there is a problem in which the reaching distance of the transmission signal becomes short and the communication range becomes narrow.

DISCLOSURE OF THE INVENTION

An object of the present invention is to provide a band limiting method and a wireless communication system capable of realizing a high use efficiency of radio frequency and a wide communication range.

To attain the object, in the present invention, a receiver estimates the quality of a channel, and a transmitter amplifies a signal by a gain proportional to a difference between a required signal-to-noise power ratio and channel quality information, which is an estimation result of the channel quality, and transmits the signal so that the receiver can obtain the signal-to-noise power ratio. The receiver or the transmitter determines a roll-off rate of an adaptive filter based on channel quality information, and the transmitter filters the signal by using the adaptive filter of the determined roll-off rate and transmits the signal.

Thus, an optimal selection of the roll-off rate of the adaptive filter in accordance with the channel quality enables performing a transmission that is high in frequency use efficiency by, for example, selecting a small roll-off rate when the channel quality is good, i.e., when a required value of the transmission power is small. Selecting a large roll-off rate when the channel quality is bad, i.e., when the required value of the transmission power is large, enables reducing the PAPR and improving the communication range.

Therefore, an optimal selection of the roll-off rate of the adaptive filter in accordance with the channel quality enables achieving a high frequency use efficiency and a wide communication range.

BEST MODE FOR CARRYING OUT THE INVENTION

The present invention will now be described with reference to the drawings.

First Exemplary Embodiment

Figure 1:
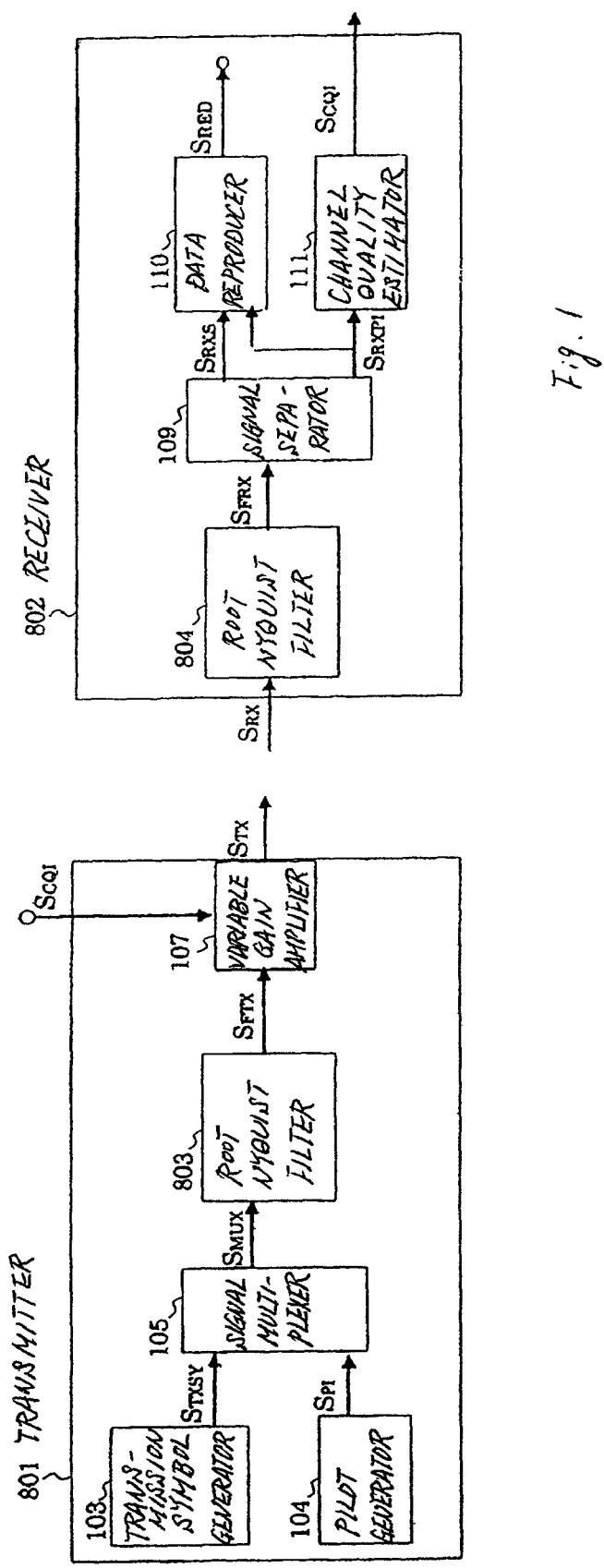
FIG. 1 is a block diagram showing a configuration of a related wireless communication system.
Figure 2:
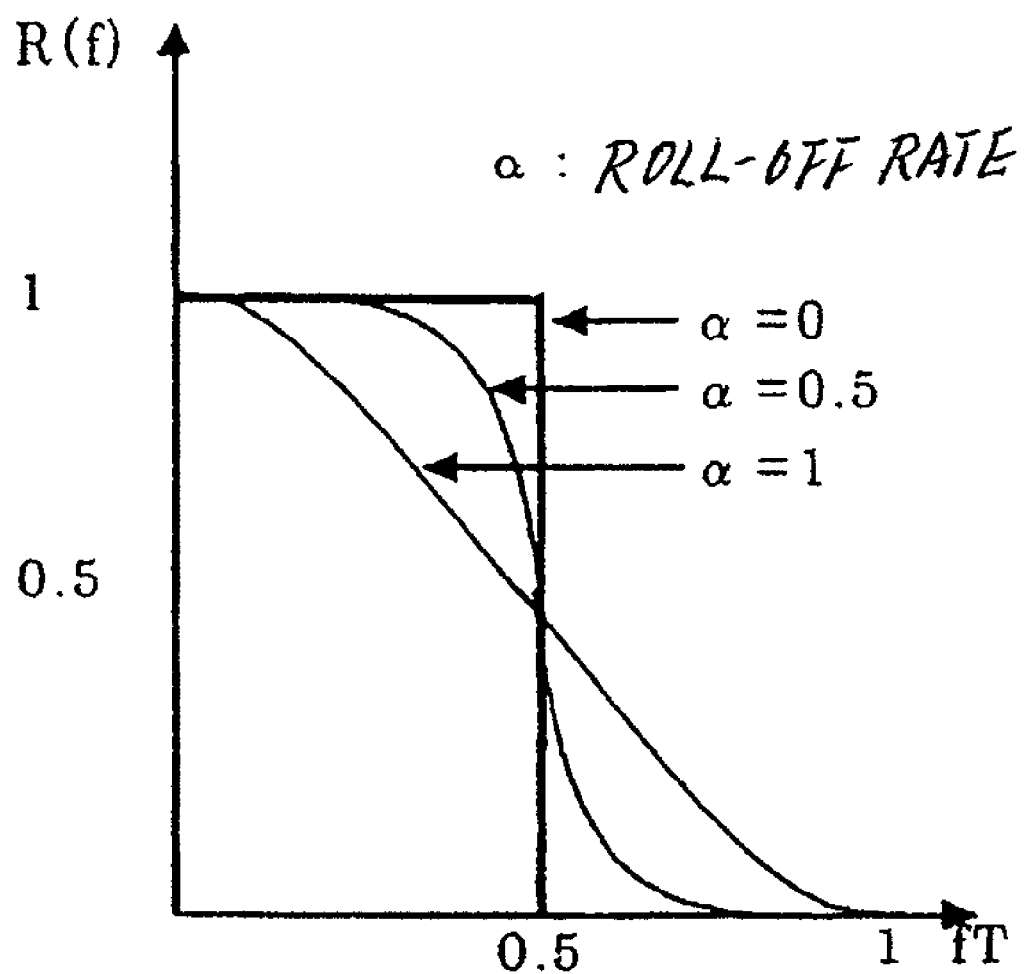
FIG. 2 is a graph showing characteristics of a root Nyquist filter shown in FIG. 1.
Figure 3:
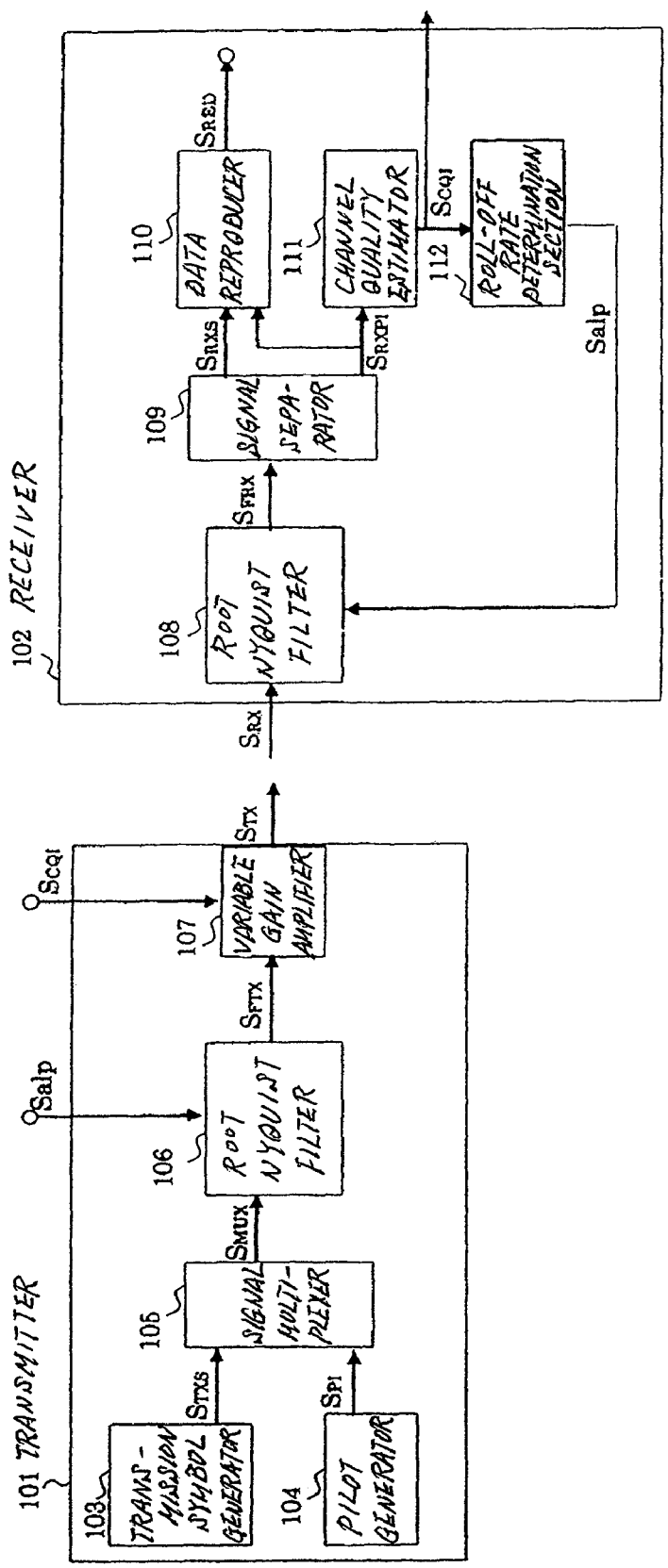
FIG. 3 is a block diagram showing a configuration of a first exemplary embodiment of a wireless communication system of the present invention.

FIG. 3 is a block diagram showing a configuration of a first exemplary embodiment of a wireless communication system of the present invention.

As shown in FIG. 3, the wireless communication system of the first exemplary embodiment comprises transmitter 101 and receiver 102.

Transmitter 101 comprises transmission symbol generator 103, pilot generator 104, signal multiplexer 105, root Nyquist filter 106, and variable gain amplifier 107.

Transmission symbol generator 103 generates transmission information to perform symbol mapping and outputs transmission symbol sequence $S_{TXS}$. Pilot generator 104 generates pilot symbol $S_{PI}$. Signal multiplexer 105 multiplexes transmission symbol sequence $S_{TXS}$ and pilot symbol $S_{PI}$ and outputs multiplexed signal $S_{MUX}$. Root Nyquist filter 106 applies filtering with root roll-off characteristics corresponding to roll-off rate information Salp to multiplexed signal $S_{MUX}$ and outputs filtering transmission signal $S_{FTX}$. Variable gain amplifier 107 amplifies filtering transmission signal $S_{FTX}$ in accordance with channel quality information $S_{CQI}$ and outputs the signal as transmission signal $S_{TX}$.

Receiver 102 comprises root Nyquist filter 108, signal separator 109, data reproducer 110, channel quality estimator 111, and roll-off rate determination section 112.

Root Nyquist filter 108 applies filtering with root roll-off characteristics corresponding to roll-off rate information Salp to reception signal $S_{RX}$ corresponding to transmission signal $S_{TX}$ and outputs filtering signal $S_{FRX}$. Signal separator 109 separates filtering signal $S_{FRX}$ into reception symbol sequence $S_{RXS}$ and reception pilot signal $S_{RXPI}$. Data reproducer 110 uses reception symbol sequence $S_{RXS}$ and reception pilot signal $S_{RXPI}$ to reproduce transmission data and outputs the data as reproduction data $S_{RED}$. Channel quality estimator 111 estimates channel quality from reception pilot signal $S_{RXPI}$ and outputs the estimation result as channel quality information $S_{CQI}$. Roll-off rate determination section 112 determines an optimal roll-off rate from channel quality information $S_{CQI}$ and outputs roll-off rate information Salp.

Transmitter 101 and receiver 102 are preferably constituted by, for example, a logic circuit or a memory except variable gain amplifier 107. Variable gain amplifier 107 can be realized by, for example, a well-known high frequency amplifying circuit using an FET.

The wireless communication system of the first exemplary embodiment is an example of roll-off rate determination section 112 included in receiver 102 optimally selecting the roll-off rate of the root Nyquist filter included in transmitter 101 and receiver 102 in accordance with the channel quality. Specifically, when the channel quality is good, i.e., when a required value of transmission power is small, selecting a small roll-off rate enables performing a transmission that is high in frequency use efficiency. On the other hand, when the channel quality is bad, i.e., when the required value of the transmission power is large, selecting a large roll-off rate enables to reducing the PAPR and improving the communication range.

Figure 4:
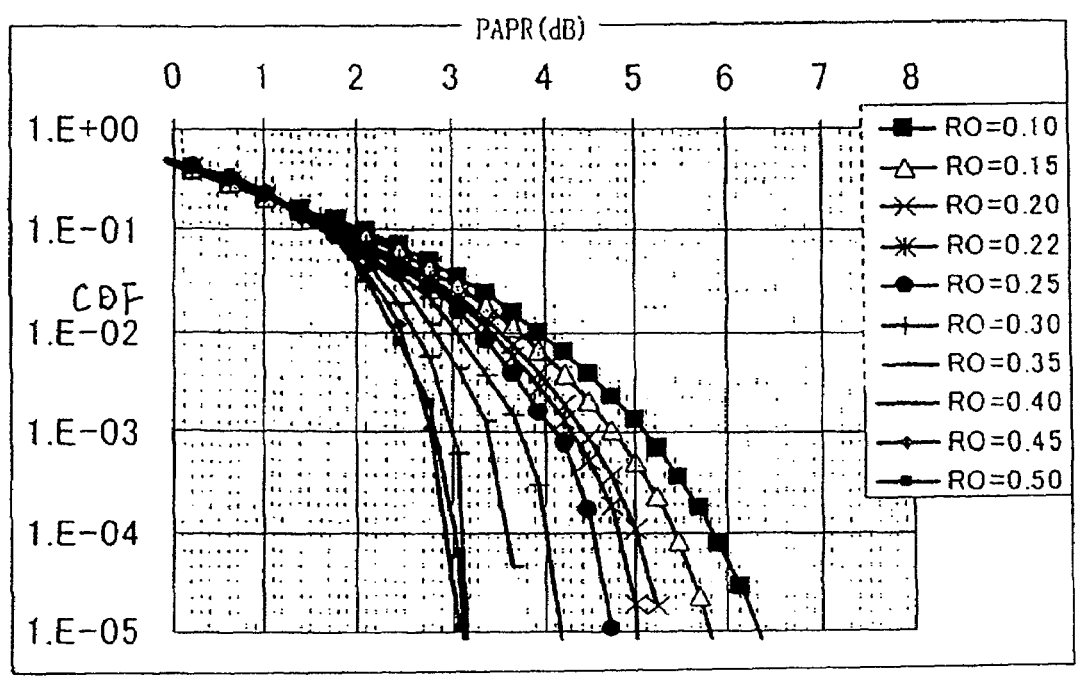
FIG. 4 is a graph showing an example of a relationship between a roll-off rate and a PAPR.

For example, a case of selecting a roll-off rate α under the conditions described below using a signal-to-noise power ratio as channel quality information $S_{CQI}$ will be considered, in which the relationship between the roll-off rate and the PAPR exhibits characteristics as shown in FIG. 4. FIG. 4 illustrates a relationship between the PAPR (dB) and cumulative distributions of each roll-off rate when the roll-off rate (represented as RO in FIG. 4) is changed from 0.10 to 0.50.

$S_{CQI} < 4$ dB ... α=0.5

$4$ dB $\leq S_{CQI} < 5$ dB ... α=0.25

$S_{CQI} \geq 5$ dB ... α=0.1

It is assumed herein that variable gain amplifier 107 selects an optimal gain proportional to a difference between a required signal-to-noise power ratio and channel quality information $S_{CQI}$ so that receiver 102 can obtain the signal-to-noise power ratio (for example, 15 dB). It is also assumed that distortion in the transmission signal does not occur until the gain of variable gain amplifier 107 reaches 10 dB when α=0.1, that is, if channel quality information (signal-to-noise power ratio) $S_{CQI}$ is 5 dB or more, receiver 102 can realize a required signal-to-noise power ratio of 15 dB without generating distortion in the transmission signal.

Now, if channel quality information (signal-to-noise power ratio herein) is $S_{CQI}=7$ dB and variable gain amplifier 107 selects gain=8 dB, roll-off rate determination section 112 selects α=0.1.

At this point, root Nyquist filter 108 of receiver 102 selects α=0.1 in accordance with roll-off rate information Salp in preparation for the next signal reception.

Root Nyquist filter 106 of transmitter 101 selects α=0.1 in accordance with roll-off rate information Salp and uses this to perform the next transmission.

At the next transmission/reception time, channel quality information is $S_{CQI}=4.5$ dB, and if variable gain amplifier 107 selects gain=10.5 dB, roll-off rate determination section 112 selects α=0.25.

In this case, when a line, in which a cumulative distribution (CDF: Cumulative Distribution Function) of a graph shown in FIG. 4 is $10^{-3}$, is observed, if α=0.25 is selected, the PAPR is decreased by about 1 dB as compared to when α=0.1 is selected. Therefore, if α=0.25 is selected, the signal can be amplified without causing a distortion up to 10.5 dB, which is larger than the maximum gain 10 dB that does not cause a distortion when α=0.1 is selected.

Furthermore, if α=0.5 is selected, the PAPR is decreased by about 3.5 dB as compared to when α=0.1 is selected. Therefore, amplification with a higher gain is possible.

In the wireless communication system of the first exemplary embodiment, root Nyquist filter 106 of transmitter 101 uses roll-off rate information Salp to select roll-off rate α, and variable gain amplifier 107 uses channel quality information $S_{CQI}$ to select a gain. Therefore, roll-off rate information Salp and channel quality information $S_{CQI}$ need to be supplied from receiver 102 to transmitter 101.

Thus, in case of a wireless communication system that communicates between first wireless communication device 1 and second wireless communication device 2 comprising transmitter 101 and receiver 102 shown in FIG. 3, for example, channel quality information $S_{CQI}$ obtained in channel quality estimator 111 of second wireless communication device 2 and roll-off rate information Salp generated by roll-off rate determination section 112 may be transmitted from second wireless communication device 2 to first wireless communication device 1 as a control signal. In this way, root Nyquist filter 106 of transmitter 101 can easily acquire roll-off rate information Salp, and variable gain amplifier 107 can easily acquire channel quality information $S_{CQI}$.

During first transmission/reception, root Nyquist filter 106 of transmitter 101 and root Nyquist filter 108 of receiver 102 may use a predetermined initial value as roll-off rate α.

In the present exemplary embodiment, a configuration has been illustrated in which each of transmitter 101 and receiver 102 comprises a root Nyquist filter. However, in the present exemplary embodiment, only transmitter 101 may comprise a root Nyquist filter because the roll-off characteristics only need to be realized in filtering a signal by transmitter 101 and receiver 102. In that case, receiver 102 preferably comprises a band-pass filter that passes a band wider than a filter having the roll-off characteristics. The configuration of the band-pass filter can be any form. Furthermore, in the exemplary embodiment, an example has been illustrated in which root Nyquist filter is used to limit a band of a transmission/reception signal. However, an adaptive filter other than the root Nyquist filter may be used as long as roll-off rate α can be changed.

According to the wireless communication system of the present exemplary embodiment, roll-off rate determination section 112 included in receiver 102 optimally selects the roll-off rate of the root Nyquist filter included in transmitter 101 and receiver 102 in accordance with the channel quality so that high frequency use efficiency and a wide communication range can be realized.

Second Exemplary Embodiment

Figure 5:
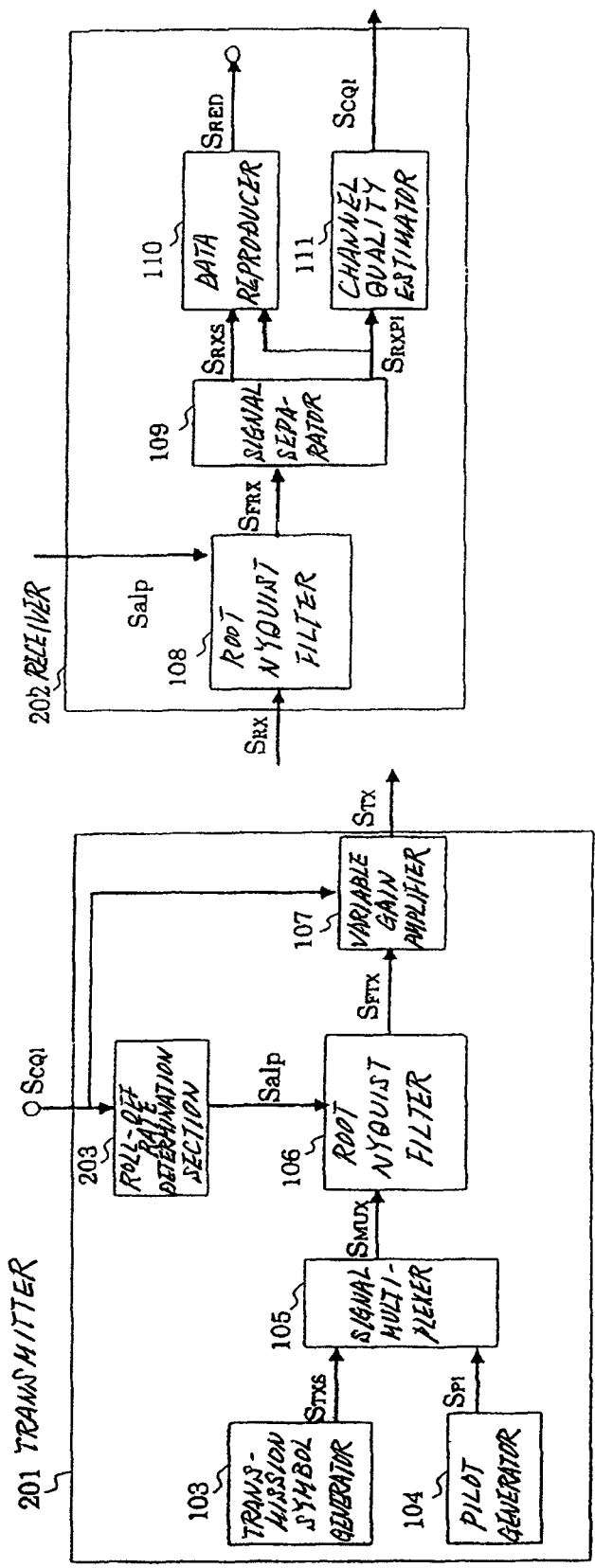
FIG. 5 is a block diagram showing a configuration of a second exemplary embodiment of the wireless communication system of the present invention.

FIG. 5 is a block diagram showing a configuration of a second exemplary embodiment of the Wireless communication system of the present invention.

As shown in FIG. 5, the wireless communication system of the second exemplary embodiment comprises transmitter 201 and receiver 202.

Transmitter 201 comprises transmission symbol generator 103, pilot generator 104, signal multiplexer 105, root Nyquist filter 106, variable gain amplifier 107, and roll-off rate determination section 203.

Transmission symbol generator 103 generates transmission information to perform symbol mapping and outputs transmission symbol sequence $S_{TXS}$. Pilot generator 104 generates pilot symbol $S_{PI}$. Signal multiplexer 105 multiplexes transmission symbol sequence $S_{TXS}$ and pilot symbol $S_{PI}$ and outputs multiplexed signal $S_{MUX}$. Roll-off rate determination section 203 determines a roll-off rate from channel quality information $S_{CQI}$ and outputs roll-off rate information Salp. Root Nyquist filter 106 applies filtering with root roll-off characteristics corresponding to roll-off rate information Salp to multiplexed signal $S_{MUX}$ and outputs the signal as filtering transmission signal $S_{FTX}$. Variable gain amplifier 107 amplifies filtering transmission signal $S_{FTX}$ in accordance with channel quality information $S_{CQI}$ and outputs transmission signal $S_{TX}$.

Receiver 202 comprises root Nyquist filter 108, signal separator 109, data reproducer 110, and channel quality estimator 111.

Root Nyquist filter 108 applies filtering with root roll-off characteristics corresponding to roll-off rate information Salp to reception signal $S_{RX}$ corresponding to transmission signal $S_{TX}$ and outputs the signal as filtering reception signal $S_{FRX}$. Signal separator 109 separates filtering signal $S_{FRX}$ into reception symbol sequence $S_{RXS}$ and reception pilot signal $S_{RXPI}$. Data reproducer 110 uses reception symbol sequence $S_{RXS}$ and reception pilot signal $S_{RXPI}$ to reproduce transmission data and outputs the data as reproduction data $S_{RED}$. Channel quality estimator 111 estimates a channel quality based on reception pilot signal $S_{RXPI}$ and outputs the estimation result as channel quality information $S_{CQI}$.

Transmitter 201 and receiver 202 are preferably constituted by, for example, a logic circuit or a memory except variable gain amplifier 107 as in the first exemplary embodiment. Variable gain amplifier 107 can be realized, for example, by a well-known high frequency amplifying circuit using an FET.

The wireless communication system of the second exemplary embodiment is an example of roll-off rate determination section 203, which is included in transmitter 201, optimally selecting the roll-off rate of root Nyquist filters 106 and 108 included in transmitter 201 and receiver 202 in accordance with the channel quality.

The selection method of the roll-off rate used by root Nyquist filters 106 and 108 is similar to that in the first exemplary embodiment. Therefore, a description will be omitted.

In the wireless communication system of the second exemplary embodiment, roll-off rate information Salp needs to be supplied to root Nyquist filter 108 of receiver 202 because roll-off rate determination section 203 of transmitter 201 generates roll-off rate information Salp. The channel quality information generated by channel quality estimator 111 of receiver 202 needs to be supplied to roll-off rate determination section 203 and variable gain amplifier 107 of transmitter 201.

Thus, in case of a wireless communication system that communicates between first wireless communication device 1 and second wireless communication device 2 comprising transmitter 201 and receiver 202 shown in FIG. 5, for example, channel quality information $S_{CQI}$ obtained in channel quality estimator 111 of second wireless communication device 2 may be transmitted from second wireless communication device 2 to first wireless communication device 1 as a control signal. In this way, roll-off rate determination section 203 and variable gain amplifier 107 of transmitter 201 can easily acquire channel quality information $S_{CQI}$. Additionally, roll-off rate information Salp generated by roll-off rate determination section 203 of first wireless communication device 1 may be transmitted from first wireless communication device 1 to second wireless communication device 2 as a control signal. In this way, root Nyquist filter 108 of receiver 202 can easily acquire roll-off rate information Salp.

During the first transmission/reception, root Nyquist filter 106 of transmitter 201 and root Nyquist filter 108 of receiver 202 may use a predetermined initial value as roll-off rate α.

In the present exemplary embodiment, a configuration has been illustrated in which transmitter 201 and receiver 202 comprises a root Nyquist filter. However, in the present exemplary embodiment, only transmitter 201 may comprise a root Nyquist filter because the roll-off characteristics only need to be realized in filtering of signal by transmitter 201 and receiver 202. In that case, receiver 202 may comprise a band-pass filter that passes a band wider than a filter having the roll-off characteristics. The configuration of the band-pass filter can be any form. Furthermore, in the exemplary embodiment, an example has been illustrated in which root Nyquist filter is used to limit a band of a transmission/reception signal. However, an adaptive filter other than the root Nyquist filter may be used as long as roll-off rate α can be changed.

According to the wireless communication system of the present exemplary embodiment, as in the first exemplary embodiment, roll-off rate determination section 203 included in transmitter 201 optimally selects the roll-off rate of the root Nyquist filter included in transmitter 201 and receiver 202 in accordance with the channel quality so that high frequency use efficiency and a wide communication range can be realized.

Third Exemplary Embodiment

Figure 6:
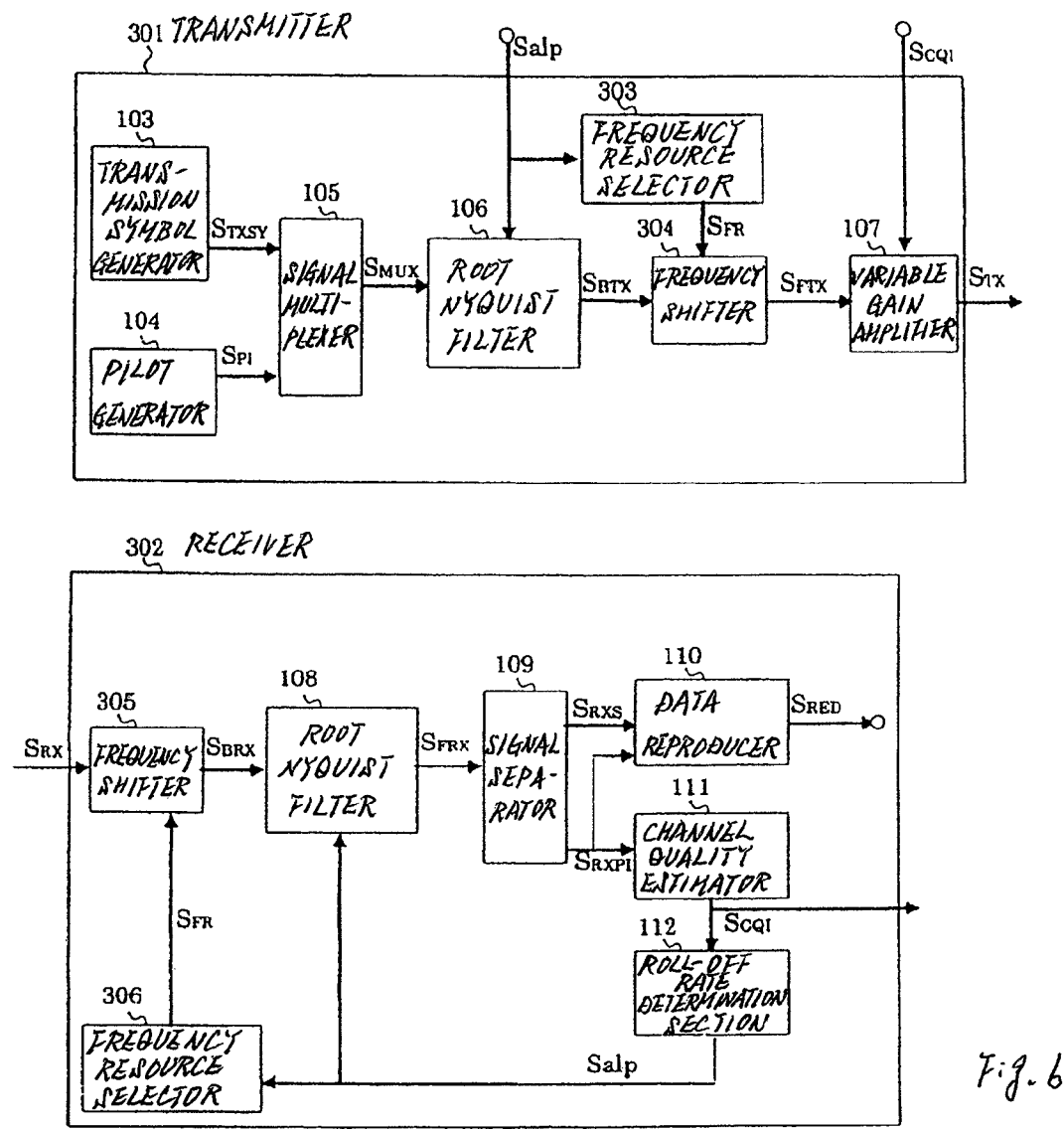
FIG. 6 is a block diagram showing a configuration of a third exemplary embodiment of the wireless communication system of the present invention.

FIG. 6 is a block diagram showing a configuration of a third exemplary embodiment of the wireless communication system of the present invention.

As shown in FIG. 6, the wireless communication system of the third exemplary embodiment comprises transmitter 301 and receiver 302.

Transmitter 301 comprises transmission symbol generator 103, pilot generator 104, signal multiplexer 105, root Nyquist filter 106, variable gain amplifier 107, frequency resource selector 303, and frequency shifter 304.

Transmission symbol generator 103 generates transmission information to perform symbol mapping and outputs transmission symbol sequence $S_{TXS}$. Pilot generator 104 generates pilot symbol $S_{PI}$. Signal multiplexer 105 multiplexes transmission symbol sequence $S_{TXS}$ and pilot symbol $S_{PI}$ and outputs multiplexed signal $S_{MUX}$. Root Nyquist filter 106 applies filtering with root roll-off characteristics corresponding to roll-off rate information Salp to multiplexed signal $S_{MUX}$ and outputs basic transmission signal $S_{BTX}$. Frequency resource selector 303 selects a frequency resource corresponding to roll-off rate information Salp and outputs frequency resource information $S_{FR}$ showing the selected frequency resource. Frequency shifter 304 shifts the frequency of basic transmission signal $S_{BTX}$ based on frequency resource information $S_{FR}$ and outputs the signal as filtering transmission signal $S_{FTX}$. Variable gain amplifier 107 amplifies filtering transmission signal $S_{FTX}$ in accordance with channel quality information $S_{CQI}$ and outputs the signal as transmission signal $S_{TX}$.

Receiver 302 comprises frequency shifter 305, frequency resource selector 306, root Nyquist filter 108, signal separator 109, data reproducer 110, channel quality estimator 111, and roll-off rate determination section 112.

Frequency shifter 305 shifts the frequency of reception signal $S_{RX}$ corresponding to transmission signal $S_{tx}$ based on frequency resource information $S_{FR}$ and outputs the signal as basic reception signal $S_{BRX}$. Root Nyquist filter 108 applies filtering with root roll-off characteristics corresponding to roll-off rate information Salp to basic reception signal $S_{BRX}$ and outputs the signal as filtering reception signal $S_{FRX}$. Signal separator 109 separates filtering signal $S_{FRX}$ into reception symbol sequence $S_{RXS}$ and reception pilot signal $S_{RXPI}$. Data reproducer 110 uses reception symbol sequence $S_{RXS}$ and reception pilot signal $S_{RXPI}$ to reproduce transmission data and outputs the data as reproduction data $S_{RED}$. Channel quality estimator 111 estimates the channel quality from reception pilot signal $S_{RXPI}$ and outputs the estimation result as channel quality information $S_{CQI}$. Roll-off rate determination section 112 determines the roll-off rate from channel quality information $S_{CQI}$ and outputs roll-off rate information Salp. Frequency resource selector 306 selects a frequency resource corresponding to roll-off rate information Salp and outputs frequency resource information $S_{FR}$.

Transmitter 301 and receiver 302 are preferably constituted by, for example, a logic circuit or a memory except variable gain amplifier 107 as in the first and second exemplary embodiments. Variable gain amplifier 107 can be realized by, for example, a well-known high frequency amplifying circuit using an FET.

The wireless communication system of the third exemplary embodiment is an example in which a total frequency band used for communication is divided into a plurality of frequency blocks and the frequency blocks used for transmission/reception of signal are allocated in accordance with values of the roll-off rate so that the frequency resource is efficiently used. The selection method of the roll-off rate used by root Nyquist filters 106 and 108 are similar to that in the first exemplary embodiment. Therefore, a description will be omitted.

Figure 7:
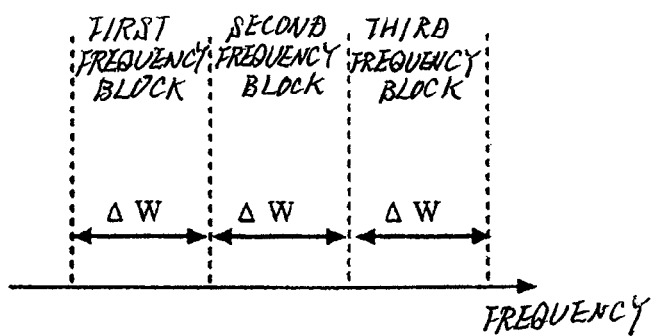
FIG. 7 is a graph showing dividing a frequency band used in the wireless communication system of the third exemplary embodiment.

As shown in FIG. 7, a case of dividing a total frequency band used in the wireless communication system comprising transmitter 301 and receiver 302 shown in FIG. 6 into three frequency blocks with equal bandwidth will now be considered.

Figure 8:
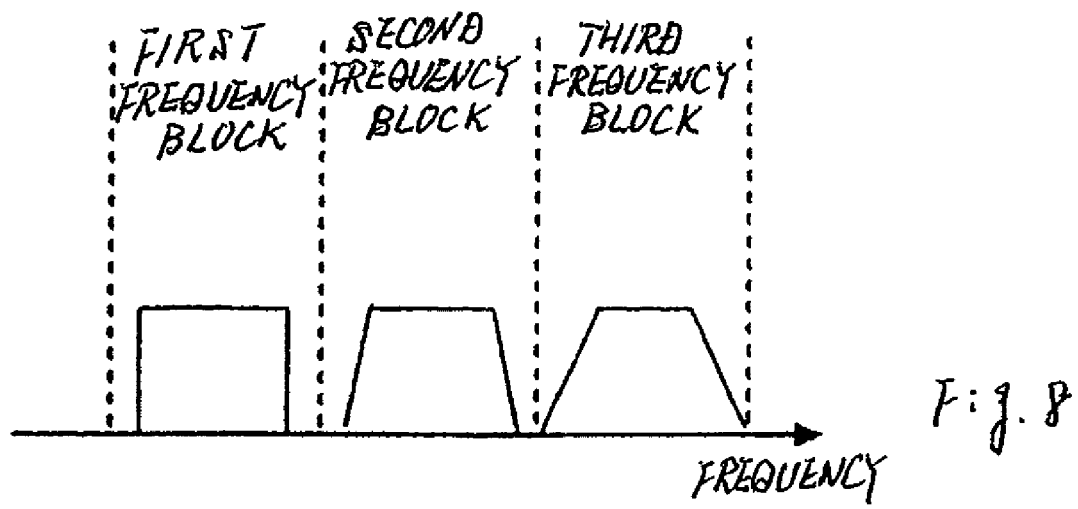
FIG. 8 is a graph showing a spectrum example when a frequency block used in accordance with a roll-off rate of the root Nyquist filter is selected.

For example, a case will be considered in which a first frequency block is used for transmission of a signal where $\alpha=0.1$ is selected, a second frequency block is used for transmission of a signal where $\alpha=0.25$ is selected, and a third frequency block is used for transmission of a signal where $\alpha=0.5$ is selected. In this case, spectrum waveforms of the frequency blocks are as shown in FIG. 8. The allocation of the frequency blocks used for transmission/reception of a signal in accordance with the values of the roll-off rate leads to transmission and reception of a signal that is filtered with a fixed roll-off rate in each frequency block. FIG. 8 illustrates an example in which the smaller the roll-off rate $\alpha$, the lower is the frequency of a frequency block being allocated. However, the arrangement may be such that the smaller the roll-off rate $\alpha$, the higher is the frequency of a frequency block being allocated.

Figure 9:
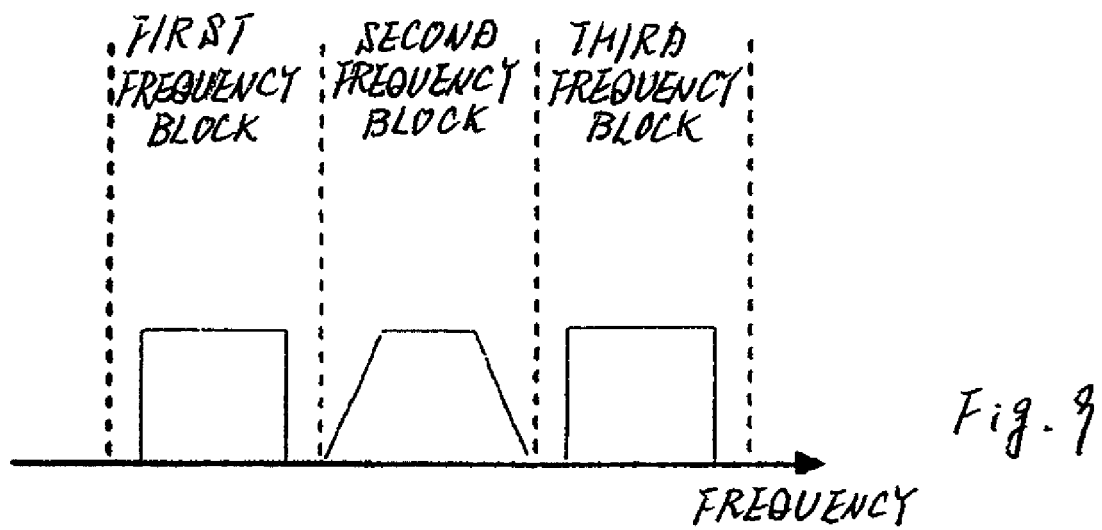
FIG. 9 is a graph showing another example of a spectrum when a frequency block used in accordance with a roll-off rate of the root Nyquist filter is selected.

A case will be considered in which the first frequency block is used when $\alpha=0.1$ is selected, the second frequency block is used when $\alpha=0.5$ is selected, and the third frequency block is used when $\alpha=0.1$ is selected. In this case, the spectrum waveforms of the frequency blocks are as shown in FIG. 9. As shown in FIG. 9, if a frequency block located at a band edge of total frequency band is allocated to a signal corresponding to the smallest value of roll-off rate $\alpha$, the signal strength sharply attenuates at the band edge. Therefore, an interference with a radio frequency used by another wireless communication system can be prevented without impairing the use efficiency of the frequency.

In FIGS. 7 to 9, an example has been illustrated in which a total frequency band used in the wireless communication system is divided into three frequency blocks each having equal bandwidth. However, the number of divisions can be any number instead of three. The bandwidths of the frequency blocks do not have to be equal. Each frequency block may have a different bandwidth. For example, allocation of the widest bandwidth to a frequency block used for transmission/reception of a signal corresponding to the largest value of the roll-off rate enables broadening the signal band for transmission/reception in the frequency block.

In the present exemplary embodiment, a configuration has been illustrated in which transmitter 301 and receiver 302 comprises a root Nyquist filter. However, in the present exemplary embodiment, only transmitter 301 may comprise a root Nyquist filter because the roll-off characteristics only need to be realized when a signal is filtered by transmitter 301 and receiver 302. In that case, receiver 302 may comprise a band-pass filter that passes a signal having the band wider than a filter having the roll-off characteristics. The configuration of the band-pass filter can be any form. Furthermore, in the present exemplary embodiment, an example has been illustrated in which a root Nyquist filter is used to limit the band of a transmission/reception signal. However, an adaptive filter other than the root Nyquist filter may be used as long as roll-off rate $\alpha$ can be changed.

According to the wireless communication system of the present exemplary embodiment, as in the first exemplary embodiment, roll-off rate determination section 112 included in receiver 302 optimally selects the roll-off rate of the root Nyquist filter included in transmitter 301 and receiver 302 in accordance with the channel quality, thereby realizing a high frequency use efficiency and a wide communication range.

Furthermore, in the wireless communication system of the present exemplary embodiment, a total frequency band for use is divided into a plurality of frequency blocks, and the frequency blocks are optimally allocated in accordance with the roll-off rate of the root Nyquist filter so that the frequency resource can be more efficiently used.

Fourth Exemplary Embodiment

Figure 10:
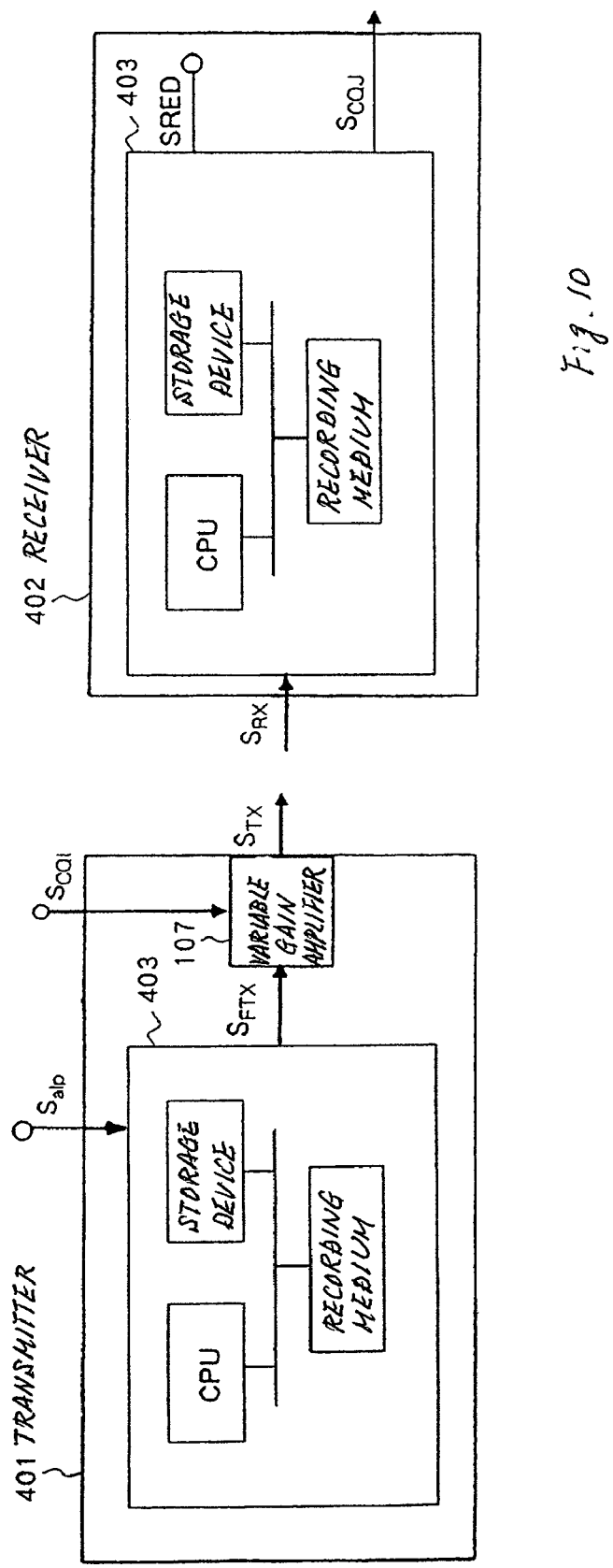
FIG. 10 is a block diagram showing a configuration of a fourth embodiment of the wireless communication system of the present invention.

FIG. 10 is a block diagram showing a configuration of a fourth exemplary embodiment of the wireless communication system of the present invention.

As shown in FIG. 10, the wireless communication system of the fourth exemplary embodiment comprises transmitter 401 and receiver 402.

Transmitter 401 comprises signal processor 403 and variable gain amplifier 107. Signal processor 403 includes, for example, a computer including a CPU (or DSP) that executes a process according to a program, a storage device used in the process by the CPU, and a recording medium stored with the program.

Signal processor 403 executes various processes of the transmitters, except variable gain amplifier 107, shown in the first exemplary embodiment to the third exemplary embodiment by the CPU (or DSP) in accordance with the program stored in the recording medium.

Receiver 402 comprises signal processor 404. Signal processor 404 is constituted by, for example, a computer comprising a CPU (or DSP) that executes a process according to a program, a storage device used in the process of the CPU, and a recording medium stored with the program.

Signal processor 404 executes various processes of the receivers shown in the first exemplary embodiment to the third exemplary embodiment by the CPU (or DSP) in accordance with the program stored in the recording medium.

Signal processor 403 of transmitter 401 and signal processor 404 of receiver 402 may be separately provided or may be configured as one processor to be shared therebetween.

According to the configuration of the present exemplary embodiment, similar advantages to the wireless communication systems in the first exemplary embodiment to the third exemplary embodiment can be obtained.

The invention claimed is:

1. A band limiting method for limiting a bandwidth of a signal that is transmitted/received between a transmitter and a receiver, the method comprising:
   said receiver estimating a channel quality;
   said transmitter amplifying the signal by a gain proportional to a difference between a required signal-to-noise power ratio and channel quality information, which is an estimation result of the channel quality, and transmitting the signal so that said receiver can obtain said signal-to-noise power ratio;
   said receiver determining a roll-off rate of an adaptive filter that causes the filtering of a signal by said transmitter and said receiver to have roll-off characteristics based on said channel quality information; and
   said transmitter using said adaptive filter including the determined roll-off rate to filter and transmit the signal.

2. A band limiting method for limiting a bandwidth of signal that is transmitted/received between a transmitter and a receiver, the method comprising:
   said receiver estimating a channel quality;
   said transmitter amplifying the signal by a gain proportional to a difference between a required signal-to-noise power ratio and channel quality information, which is an estimation result of the channel quality, and transmitting the signal so that said receiver can obtain said signal-to-noise power ratio;
   said transmitter determining a roll-off rate of an adaptive filter that causes the filtering of a signal by said transmitter and said receiver to have roll-off characteristics based on said channel quality information; and
   said transmitter using said adaptive filter including the determined roll-off rate to filter and transmit the signal.

3. The band limiting method according to claim 1, wherein the larger the transmission power of said signal, the larger is the value of said roll-off rate that is set.

4. The band limiting method according to claim 1, wherein
   a total frequency band used for transmission/reception of a signal between the transmitter and the receiver is divided into a plurality of frequency blocks, and
   the frequency blocks used for transmission/reception of a signal are respectively allocated in accordance with values of said determined roll-off rate.

5. The band limiting method according to claim 4, wherein
   a frequency block located at a band edge of a total frequency band used for transmission/reception of a signal between said transmitter and said receiver among said plurality of frequency blocks is used for transmission/reception of a signal whose value corresponds to the smallest value of said roll-off rate.

6. The band limiting method according to claim 4, wherein
   a bandwidth of a frequency block used for transmission/reception of a signal whose value corresponds to the largest value of said roll-off rate among said plurality of frequency blocks is made widest.

7. A wireless communication system for limiting the bandwidth of a signal that is transmitted/received between a transmitter and a receiver, said receiver comprising:
   a channel quality estimator that estimates a channel quality; and
   a roll-off rate determination section that determines a roll-off rate of an adaptive filter that causes the filtering of a signal by said transmitter and said receiver to have roll-off characteristics based on channel quality information that is an estimation result of said channel quality, and said transmitter comprising:
   a variable gain amplifier that amplifies the signal by a gain proportional to a difference between a required signal-to-noise power ratio and said channel quality information and transmits the signal so that said receiver can obtain said signal-to-noise power ratio; and
   an adaptive filter that filters the signal to be transmitted at the roll-off rate determined by said roll-off rate determination section.

8. A wireless communication system for limiting the bandwidth of a signal that is transmitted/received between a transmitter and a receiver, said receiver comprising:
   a channel quality estimator that estimates a channel quality, and said transmitter comprising:
   a roll-off rate determination section that determines a roll-off rate of an adaptive filter that causes the filtering of a signal by said transmitter and said receiver to have roll-off characteristics based on channel quality information that is an estimation result of said channel quality;

a variable gain amplifier that amplifies the signal by a gain proportional to a difference between a required signal-to-noise power ratio and said channel quality information and transmits the signal so that said receiver can obtain said signal-to-noise power ratio; and an adaptive filter that filters the signal to be transmitted at the roll-off rate determined by said roll-off rate determination section.

9. The wireless communication system according to claim 7, wherein the larger the transmission power of said signal, the larger is the value of said roll-off rate that is set by said roll-off rate determination section.

10. The wireless communication system according to claim 7, wherein said transmitter and said receiver divide a total frequency band used for transmission/reception of a signal into a plurality of frequency blocks and respectively allocate the frequency blocks used for transmission/reception of a signal in accordance with values of said determined roll-off rate.

11. The wireless communication system according to claim 10, wherein said transmitter and said receiver use a frequency block located at a band edge of a total frequency band used for transmission/reception of a signal among said plurality of frequency blocks for transmission/reception of a signal whose value corresponds to the smallest value of said roll-off rate.

12. The wireless communication system according to claim 10, wherein said transmitter and said receiver make a bandwidth of a frequency block used for transmission/reception of a signal whose value corresponds to said roll-off rate with the largest value among said plurality of frequency blocks widest.

13. A program for causing a computer to execute a process for limiting the bandwidth of a signal to be transmitted/received, the program causing a computer to execute processes of:

estimating a channel quality of a received signal;

amplifying the signal in a variable gain amplifier by a gain proportional to a difference between a required signal-to-noise power ratio and channel quality information, which is an estimation result of the channel quality, and transmitting the signal so that said signal-to-noise power ratio can be obtained by said received signal; and filtering the signal to be transmitted/received by roll-off characteristics having a roll-off rate determined based on said channel quality information which is an estimation result of said channel quality.

14. The program according to claim 13, wherein the larger the transmission power of the signal, the larger is the value of said roll-off rate that must be set by process executed by a computer.

15. The program according to claim 13, said program causing the computer to execute processes of:

dividing a total frequency band used for transmission/reception of a signal into a plurality of frequency blocks, and respectively allocating said frequency blocks used for transmission/reception of a signal in accordance with values of said determined roll-off rate.

16. The program according to claim 15, said program causing the computer to execute a process of using a frequency block located at a band edge of a total frequency band used for transmission/reception of a signal among said plurality of frequency blocks for transmission/reception of a signal whose value corresponds to the smallest value of said roll-off rate.

17. The program according to claim 15, said program causing the computer to execute a process of making a bandwidth of a frequency block used for transmission/reception of a signal whose value corresponds to said roll-off rate with the largest value among said plurality of frequency blocks widest.

* * * * *